United States Patent Office 3,374,190
Patented Mar. 19, 1968

3,374,190
2,4,6 - TRIARYL SULFONYLHYDRAZIDO - s - TRIAZINES AS BLOWING AGENTS FOR HIGH MOLECULAR WEIGHT ORGANIC POLYMERS
John E. Herweh and Algirdas C. Poshkus, Lancaster, Pa., assignors to Armstrong Cork Company, Lancaster, Pa., a corporation of Pennsylvania
No Drawing. Filed Nov. 1, 1965, Ser. No. 505,985
6 Claims. (Cl. 260—2.5)

ABSTRACT OF THE DISCLOSURE

A process for forming cellular organic polymeric compositions wherein, 2,4,6 triaryl sulfonyl hydrazido-s-triazines are incorporated in the polymer and decomposed with heat. The aryl substituents on the triazine may be phenyl, substituted phenyl, naphthyl, and substituted naphthyl.

---

This invention relates to the process of forming cellular organic plastic compositions and particularly relates to the use of 2,4,6-triarylsulfonylhydrazido-s-triazines as blowing agents for high molecular weight organic plastics.

Triaryl derivatives of sulfonylhydrazido-s-triazines are generically disclosed in D'Alelio et al. U.S. Patent 2,392,- 649 and suggested uses for compounds of the structures disclosed are plasticizers and intermediates in the preparation of derivatives therefrom. We have now found that 2,4,6 - triarylsulfonylhydrazido - s - triazines form a valuable class of blowing agents useful for producing cellular organic plastic compositions.

The 2,4,6-triarylsulfonylhydrazido-s-triazines useful in the practice of this invention may be represented by the following general formula:

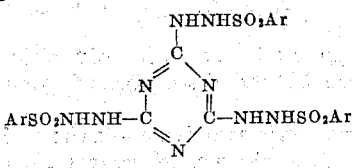

where Ar represents a radical selected from the group consisting of

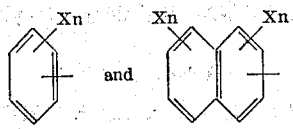

wherein $n$ is an integer from 0 to 3 and X is a radical selected from the group consisting of alkyl containing from about 1 to about 10 carbon atoms, alkoxy containing from 1 to about 10 carbon atoms, halogen, and nitro.

Arylsulfonylhydrazides may be conveniently converted to the subject compounds, 2,4,6-trisubstituted sulfonylhydrazido-s-triazines by the following reaction:

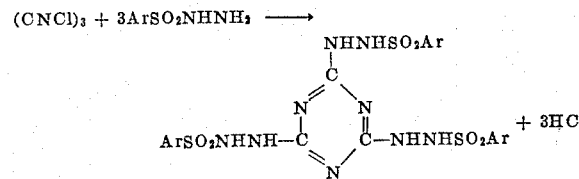

The reaction may be carried out in an inert non-polar solvent such as benzene and toluene or in polar solvents which are non-reactive to both the cyanuric chloride and the sulfonylhydrazide, such as tetrahydrothiophene 1,1-dioxide or the dimethyl ether of tetraethylene glycol. Reactions carried out in benzene usually involve two phases due to the insoluble nature of the starting sulfonylhydrazide; those performed in the polar solvents mentioned are homogeneous initially. In all cases, heat is necessary to facilitate the reaction, care being exercised however to insure that the reaction temperatures do not exceed the decomposition temperature of the starting sulfonylhydrazide. An excess of starting sulfonylhydrazide is used to compensate for hydrazide lost due to decomposition. The reaction product is insoluble in benzene and can be isolated by filtration and, where reactions are carried out in the polar solvents, the reaction mixture must be diluted with a non-solvent in order to bring about product separation. The completeness of the reaction may be determined by the amount of hydrogen chloride evolved.

The 2,4,6 - trisubstituted sulfonylhydrazido - s - triazines of this invention are amorphous white powders soluble in dimethylformamide, tetrahydrofuran, dimethyl ether of ethylene glycol, dimethyl ether of diethylene glycol, and dilute aqueous alkali. In contrast, the subject compounds are insoluble in dilute mineral acids, water, and common organic solvents such as benzene and alcohol. Yields of the triazine derivatives are quite high.

The following examples illustrate the preparation of representative triaryl derivatives which are useful in the practice of this invention.

EXAMPLE 1

*Preparation of 2,4,6-tribenzenesulfonylhydrazido-s-triazine*

12.9 grams (0.075 mole) of benzenesulfonylhydrazide was added to a stirred solution of 4.6 grams (0.025 mole) of cyanuric chloride in 100 ml. of benzene. The reaction mixture was heated at 75°–80° C. for 14 hours, cooled and filtered. The filter-cake was washed with fresh benzene and dried to give 16.6 grams of crude product. This reaction product, a white powder, was slurried with dilute hydrochloric acid and filtered. The washed and dried filter-cake, 14.0 grams, melted at 240°–244° C. with decomposition.

The solid was dissolved in a minimum amount (approximately 50 ml.) of warm dimethylformamide, filtered and precipitated by addition to cold water (approximately 400 ml.). After repeating this procedure several times, the precipitant was dried in vacuo at 110° C. The dried reaction product melted at 243°–244° C. with decomposition.

*Analysis.*—Calcd. for $C_{21}H_{21}N_9O_6S_3$: C, 42.6; H, 3.6; N, 21.3; S, 16.3. Found: C, 42.5; H, 3.7; N, 21.3; S, 16.2.

EXAMPLE 2

*Preparation of 2,4,6-tri-p-chlorobenzenesulfonylhydrazido-s-triazine*

37.2 grams (0.18 mole) of p-chlorobenzenesulfonylhydrazide was added to a solution of 9.2 grams of cyanuric chloride (0.05 mole) in 225 ml. of dry benzene. The stirred reaction mixture was heated at 85°±5° C.

for 19½ hours. The cooled gelatinous pasty mass was filtered, washed with ether and dried in vacuo. The dried crude reaction product (42.4 grams) having a melting point of 197°–232° C. was powdered and slurried with aqueous 3 N hydrochloric acid. Aqueous acidic insolubles were filtered, washed consecutively with water, alcohol and ether. The dried white solid filter-cake (31.9 grams) melted at 238°–240° C. with decomposition. Two recrystallizations from boiling dioxane gave a purified material having a melting point of 251°–252° C.

*Analysis.*—Calcd. for $C_{21}H_{18}Cl_3N_9O_6S_3$: C, 36.3; H, 2.6; Cl, 15.3; N, 18.2; S, 13.8. Found: C, 36.5; H, 2.6; Cl, 15.1; N, 18.1; S, 13.6.

The following table lists a number of 2,4,6-trisubstituted sulfonylhydrazido-s-triazines prepared by reacting the corresponding sulfonylhydrazide with cyanuric chloride.

TABLE.—2,4,6-TRISUBSTITUTED SULFONYLHYDRAZIDO-s-TRIAZINES $$ArSO_2NHNH-\underset{\underset{N}{\|}}{\overset{\overset{NHNHSO_2Ar}{|}}{C}}\phantom{xx}-NHNHSO_2Ar$$

| Ar= | Reaction Solvent | Yield, Percent | M.P., °C. | Vol. of Gas (STP) ml. per gram |
|---|---|---|---|---|
| Phenyl | Benzene | 95 | 243–244 dec | 107 |
| p-Tolyl | Tetrahydrothiophene 1,0 dioxide | 91 | 232–234 dec | 96 |
| p-Chlorophenyl | Benzene | 93 | 251–252 dec | 90 |
| p-Methoxyphenyl | do | 94 | 239–240 dec | 86 |
| 2-naphthyl | do | 91 | 230–232 dec | 95 |

As shown in the table, the subject compounds melt with decomposition at relatively high temperatures; considerably higher than the starting sulfonylhydrazides. Decomposition of the triazine derivatives was carried out by heating a slurry of the particular compound in 10 ml. of Nujol, a heavy refined paraffin oil (hydrocarbon). Gaseous decomposition products were evolved when the reaction temperature reached the decomposition point of the triazine derivative.

Nitrogen is the major gaseous decomposition product as shown by gas chromotography and accounted for about 40%–50% of the gaseous decomposition products. The subject compounds are useful as high temperature blowing agents for expanding high molecular weight organic resins, particularly those capable of withstanding high processing temperatures such as the silicone rubbers. The compounds of this invention thus offer flexibility in foaming, both in techniques and choice of compositions.

EXAMPLE 3

*Expansion of silicone rubber*

A master batch containing 300 grams of a filled rubbery copolymer of dimethylsiloxane and phenylsiloxane, 1.8 grams of bis(t-butylperoxy)-2,5-dimethylhexane and 30 grams of 2,4,6-triphenylsulfonylhydrazido-s-triazine was cold milled on a 12″ two-roll rubber mill into a sheet using roll temperatures of 70°–75° F. A series of ⅛″ thick disks were cut from the sheet stock, which had an average density of 1.2 grams per ml., and these disks were expanded between the platens of a Presco Hydraulic Press using platen temperatures of 500° F. and hold times in the press of 10 minutes. The resultant stock was a cellular sponge rubber-like material having an average density of 0.7 gram per ml.

We claim:
1. The process which comprises incorporating a sulfonylhydrazido-s-triazine having the formula:

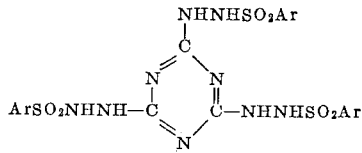

where Ar represents a radical selected from the group consisting of

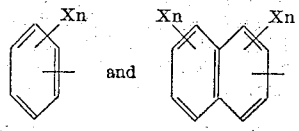

wherein $n$ is an integer from 0 to 3, and X is a radical selected from the group consisting of alkyl containing from 1 to about 10 carbon atoms, alkoxy containing from 1 to about 10 carbon atoms, halogen, and nitro in a high molecular weight organic resin and heating this mixture to a temperature above the decomposition point of said hydrazide.

2. The process in accordance with claim 1 in which said triazine is 2,4,6-tribenzenesulfonylhydrazido-s-triazine.

3. The process in accordance with claim 1 in which said triazine is 2,4,6 - tri - p - chlorobenzenesulfonylhydrazido-s-triazine.

4. The process in accordance with claim 1 in which said triazine is 2,4,6-tri-p-toluenesulfonylhydrazido-s-triazine.

5. The process in accordance with claim 1 in which said triazine is 2,4,6-tri-p-methoxybenzenesulfonylhydrazido-s-triazine.

6. The process in accordance with claim 1 in which said triazine is 2,4,6-2-naphthalenesulfonylhydrazido-s-triazine.

References Cited

UNITED STATES PATENTS

| | | | |
|---|---|---|---|
| 2,211,709 | 8/1940 | Zerweck et al. | 260—249.6 |
| 2,766,226 | 10/1956 | Hardy et al. | 260—2.5 |
| 2,806,823 | 9/1957 | Sullivan | 260—2.5 |

MURRAY TILLMAN, *Primary Examiner.*

M. FOELAK, *Assistant Examiner.*